United States Patent [19]

Palmer et al.

[11] 4,205,123
[45] May 27, 1980

[54] BATTERY SEPARATOR WITH POROUS BODY AND FUSED RIB

[75] Inventors: Nigel I. Palmer, Lexington; Don O. Grammer, Scituate, both of Mass.

[73] Assignee: W. R. Grace & Co., Cambridge, Mass.

[21] Appl. No.: 728,341

[22] Filed: Sep. 30, 1976

Related U.S. Application Data

[62] Division of Ser. No. 317,107, Dec. 21, 1972, Pat. No. 4,003,758.

[51] Int. Cl.² ............................................. H01M 2/16
[52] U.S. Cl. ................................... 429/147; 156/196; 264/115; 264/119; 264/126; 264/286
[58] Field of Search ....................... 429/147, 145, 129; 206/2.5 M; 156/306, 196

[56] References Cited

U.S. PATENT DOCUMENTS

| | | | |
|---|---|---|---|
| 2,687,445 | 8/1954 | Merrill | 429/147 |
| 2,850,559 | 9/1958 | Stickel | 429/147 |
| 3,440,108 | 4/1969 | Hefftner | 429/146 |

FOREIGN PATENT DOCUMENTS 1225543  7/1960  France .................................... 429/147

*Primary Examiner*—Donald L. Walton
*Attorney, Agent, or Firm*—Edward J. Hanson, Jr.; C. E. Parker

[57] ABSTRACT

Battery separators with degradation resistant rib areas are produced from nonwoven mats of thermoplastic fibers by substantially fusing the fibers in raised regions of the mat. The fusion is progressively lessened toward the base of the rib. The rib is formed by the application of heat and pressure. The mat is also supplied with other important characteristics such as small pore size during treatment to compact its fibers.

7 Claims, 8 Drawing Figures

FIG. 3
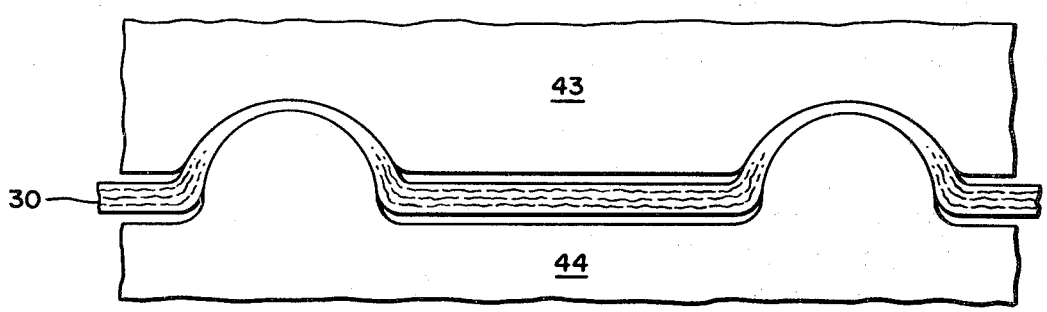
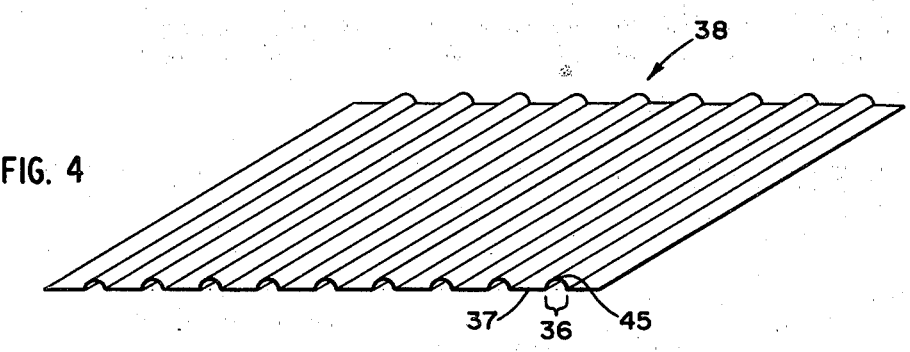
FIG. 4
FIG. 5
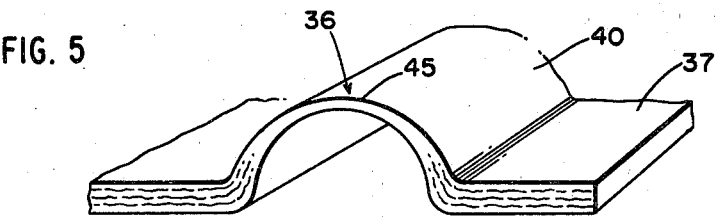

BATTERY SEPARATOR WITH POROUS BODY AND FUSED RIB

This is a division, of application Ser. No. 317,107, now U.S. Pat. No. 4,003,758 filed Dec. 21, 1972.

BACKGROUND OF THE INVENTION

This invention relates to mats suitable for use as battery separators and, more particularly, to such mats with degradation resistant spacer embossments formed therein.

Producing battery separators that have a long life in the rigorous environment of a lead acid storage battery has long presented a multitude of problems. Progress toward the solution of these problems is well recorded in the patent literature. A minor failure in the separator can result in the loss of the complete useful life of a battery. When areas of a separator are embossed to provide for a spacing function, these areas are particularly susceptible to failure because they receive a greater abuse from scouring and buffeting as a result of the vibration and shifting of the battery parts per unit area. This is because of the smaller area in contact with the battery plate. In addition, the embossments are normally engaged against the positive plate where the conditions condusive to the highest oxidation rate are present.

For these and other reasons the formation of spacer areas in battery separators that differ from the adjacent areas is known as shown in U.S. Pat. Nos. 1,357,378; 2,626,429; 2,687,445; 2,687,446; and 2,850,559. It is also known to protect felted fibers from the acid environment of a battery by, for example, coating the web as shown in U.S. Pat. No. 2,687,447.

SUMMARY OF THE INVENTION

By an aspect of this invention in one preferred form thereof, a method is provided for producing a porous mat with ribs of reduced porosity formed therein. The rib is differentially compressed to lower its porosity relatively. The preferred mat is an embossed fibrous web particularly suited for use as a battery separator or the like. The method preferably includes forming the web to have a region with an outer area extending beyond a second region. The web is treated to substantially fuse the fibers and at least substantially eliminate the interstices of the outer area of the first region while maintaining at least a substantial portion of the second region open between the fibers.

In a preferred form the fibrous web joining the first and second regions is treated to fuse the fibers to a progressively diminishing degree from the outer area that is substantially fused toward the second region where at least a substantial portion of the region is open. The preferred manufacturing procedure involves utilizing a web that is formed of nonwoven fibers. The initial web is preferably 20–200 mils thick and the fiber diameter is 0.05–50 microns. The basis weight of the preferred web is 10–500 grams per square meter and this initial nonwoven web is compressed until the second surface area is 5–50 mils thick with a porosity retention of greater than 40% and a maximum pore size of less than 40 microns. The first region is preferably formed as a plurality of spaced apart linear ribs extending across the web from one edge to an opposite edge.

By another aspect of this invention in a preferred form thereof, a mat comprised of fibers is provided that is suitable for use as a particularly advantageous battery separator. The fibers are formed into a sheet having a first region and a second region with the first region extending above the second region. At least a portion of the first region has its fibers fused so that there are substantially no openings therebetween. At least a portion of the second region has interstices between the fibers.

In a particularly preferred form of the invention there is a region of transition between the fused portion and the intersticed portion of the mat with a steadily increasing fused state extending toward the fused portion from the intersticed portion. The fibers preferably have a diameter of 0.05–50 microns and the fused portion is 1.5–25 mils thick. The intersticed portion preferably has a porosity retention of greater than 40% and a maximum pore size of less than 40 microns.

The mat should provide an initial ER of no more than 25 milliohms after 24 hours. The mat should provide a battery with cold start performance such that in a Group 24, AH battery a cell will provide at least 1.00 volt at 280 amps at 0° F. after 30 sec. and no readily observable delmaination of the mat should be present after 6 months and in actual practice for more than 3 years.

By another aspect of this invention in a preferred form thereof an apparatus is provided having a first pair of calender rolls with evenly spaced calendering surfaces and a second pair of calender rolls with a plurality of raised ridges opposed by a plurality of grooves with opposed lands on both of said rolls separating said opposed ridges and grooves. The gap between the second pair of rolls is less at the opposed ridges and grooves than at the opposed lands. Generally all of the ridges are on one roll of a pair and all of the grooves on an opposite roll of a pair but this is not necessary.

It is an object of the present invention to provide an improved method for producing battery separators.

It is a further object of this invention to provide a process that may be consistently and expeditiously performed to produce battery separators of superior performance and long life.

A still further object of this invention is to provide a nonwoven battery separator having the characteristics of good stiffness, good resistance to oxidation (particularly in the rib area), and good resistance to delamination.

BRIEF DESCRIPTION OF THE DRAWINGS

FIG. 3 is a fragmentary schematic view of the rolls that fuse a portion of the rib area with a portion of the web engaged therebetween.

FIG. 4 is a schematic view of a nonwoven battery separator with embossed ribs.

FIG. 5 is a detail of one of the embossed ribs of the nonwoven battery separator.

DESCRIPTION OF THE PREFERRED EMBODIMENTS

Figure 1:
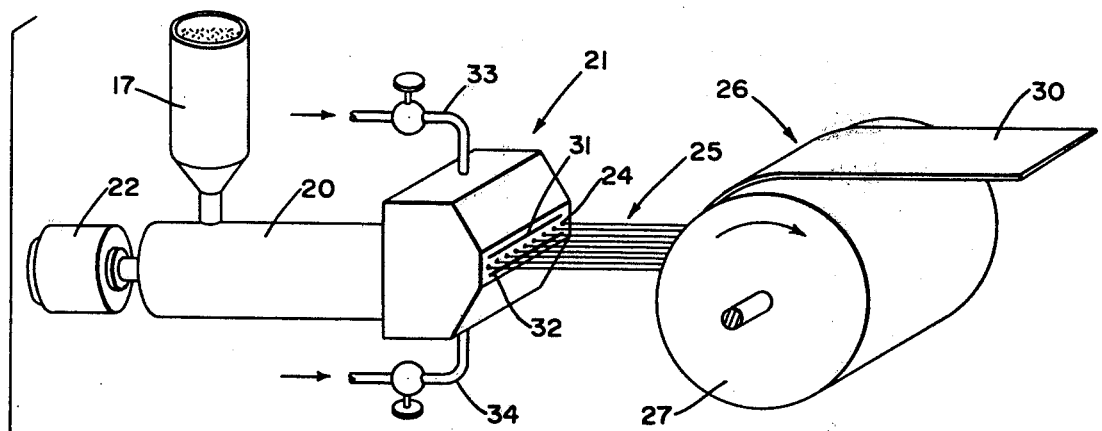
FIG. 1 is a schematic view of the overall process.
Figure 1:
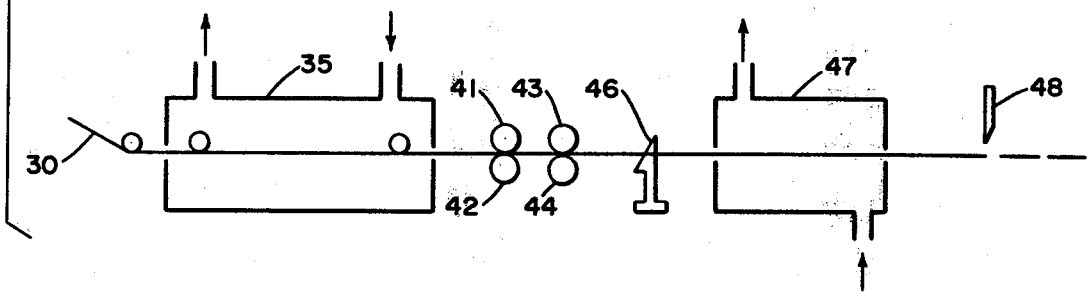

Briefly, the process of this invention in one preferred form is carried out as illustrated in FIG. 1 of the drawings. The resin that is to be formed into fibers is charged to the hopper 17 of the extruder 20. The preferred process includes thermal treatment of the resin in extruder 20 as will be further described later on. The resin is forced through extruder 20 and out through die head 21 by the drive motor 22. The die head 21 preferably has a row of die openings 24 through which the resin passes as molten strands into a fluid stream which attenuates the resin into fibers 25. The fibers 25 are collected on a moving collecting device 26 such as a drum 27 to form a continuous mat 30.

The fluid stream which attenuates the resin is supplied through jets or slots 31 and 32. The jets 31 and 32 are supplied with the fluid which is usually a hot gas, preferably air, by fluid lines 33 and 34 respectively. The gas is preferably ejected from the slots immediately above and below the row of die openings.

After the preliminary mat has been formed it is preferable to compact the mat to obtain the desired thickness, porosity, mechanical properties of strength and stability, and abrasion resistance, particularly if the mat is to be used as a battery separator. It is preferable to heat the mat at an elevated temperature prior to compression to increase the effectiveness of the compression procedure. Relatively high temperatures, that are all the same maintained substantially below the melting point, provide good tortional stiffness. In a continuous process the most convenient way of heating the mat to the required temperature is in an oven such as is illustrated at 35.

It is preferable to at least form or emboss the mat or web at the same time the compacting procedure is carried out. The embossed areas or regions 36 (FIG. 4) are formed to the extent of projecting beyond the general surface level or region 37 of the compressed mat 38. By general surface level or region, it is meant to include the entire thickness of the mat at the designated level which means without embossment. It is also possible and sometimes preferable to fuse the fibers of the outer region of the embossment at this time. However, as shown, the mat is only initially subjected to the preferred compacting and embossing procedure. The calender rolls 41 and 42 of FIG. 1 are the preferred compacting-embossing means. These are shown enlarged in FIG. 2. The embossing roll temperatures are preferably maintained at approximately the same temperature as the temperature of the countercurrent oven at the web outlet end. It is, of course, possible to form or shape the mat in a separate operation and if this is to be done, then the calender rolls 41 and 42 shown in FIG. 2 can be reshaped in obvious manner to compact without embossment.

In the presently preferred procedure a second set of calender rolls 43 and 44 immediately downstream from rolls 41 and 42 fuse the fibers by further compressing the embossed areas of the mat to the extent of at least significant and preferable substantial fusion at the outer extremity 45 of the projection of the embossment 36 beyond the general surface level 37 of said compressed mat. The calender rolls 43 and 44 are substantially the same as rolls 41 and 42 except for variations in the gap between various portions of the rolls.

A slitting operation is preferably carried out immediately after the mat leaves the nip of the calender rolls 43 and 44. The mat is quite hot after calendering in the preferred procedure and this facilitates slitting. The mat may be slit with knife 46 (FIG. 1) or a razor with little difficulty.

After the slitting operation the mat is cut across the ribs. The mat is preferably cooled prior to cutting across the ribs because this usually results in the ribs having better mechanical properties. Heat may be removed from the mat by natural convection air circulation or cooling air may be provided, as shown in FIG. 1, through cooler 47. In either case, the nonwoven mat temperature should be reduced to at least 140° F. in the preferred process prior to reaching the cutter 48. The nonwoven mat is then cut to a desired dimension. The cutter 48 may be of the guillotine type. The cutter 48 cuts the pressed nonwoven mat into the desired final dimension.

DETAILS OF CALENDERING MEANS

Figure 2:
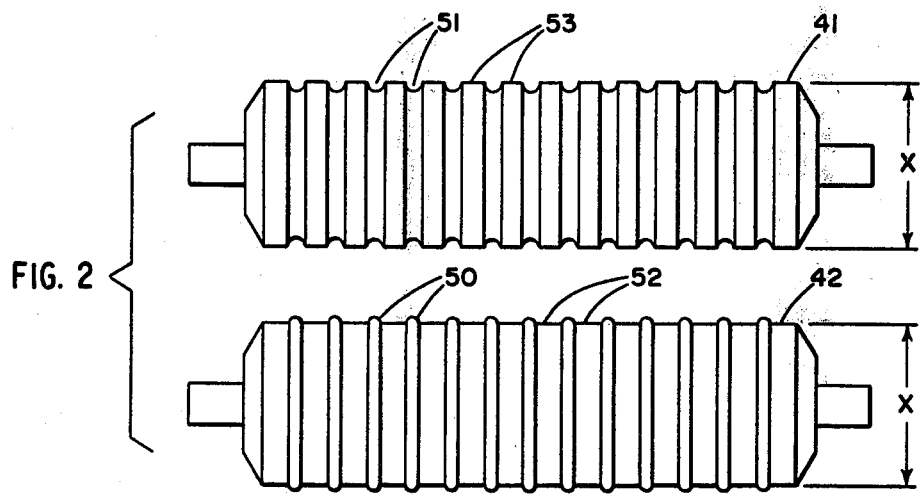
FIG. 2 is a schematic view of embossing rolls used to produce battery separators.

Turning now to a more detailed description of the preferred calendering means shown in FIG. 2, a male embossing roll 42 having ribs or ridges 50 may be seen. Exemplary of the spacing of the ribs is an even spacing of 13 rib forming raised portions 50. The diameter of the male embossing roll 42 is identical to the diameter of the female embossing roll 44. The female embossing roll has 13 grooves 51 therein. The spacing of the grooves is, of course, the same as the spacing of the ribs. The mating ribs 50 and grooves 51 are separated by lands 52 and 53 respectively.

The only differences between the first pair of calender rolls, 41 and 42, and the second pair of calender rolls 43 and 44, is that rolls 41 and 42 have evenly spaced or gapped calendering surfaces while with rolls 43 and 44 the grooves are shallower and the ribs or ridges project further and the gap between the edges of the rolls is greater. In both pairs of rolls the ridges have a smaller radius than the grooves. Both pairs of calender rolls have internal heating means capable of heating them to the temperature of intended operation of the oven 35 (FIG. 1). Rolls 41 and 42 apply substantially even compression to the mat 30 and at the same time form it with opposed surfaces having female grooves and male ridges with lands therebetween. The rolls 43 and 44 are configured and spaced to differentially compress the fibrous mat 30. First, rolls 41 and 42 evenly compress the mat by applying heat and pressure substantially uniformly to the mat. Thereafter, in a continuous process heat and pressure are applied to spaced regions of the mat while the application thereof is restricted from other regions of the mat. More specifically, the second pair of tandum rolls form heated pressure means that compress the outer extremity 45 of projection 36 to the complete fusion point and by gradually diminishing the degree of compression gradually diminish the degree of fusion in area 40. Further reduction in the degree of compression in the area where the region of the embossments 36 merge with the general surface level or base web region 37 of the mat provides no more than fusion at the points of contact between the fibers where they lie in contact with one another. This change to the condition of openness of the base web may be well up in the area 40 and in some instances even down in the base web region 37. In other words, the rolls 43 and 44 should be so dimensioned that they finalize the compression of the outer end or medial portion 45 or the rib 36 most desirably to the extent of 0 porosity. The fusion at the outer extremity of the projection 45 is most preferably to the point that at least a substantially continuous membrane is formed. In other words, the pores of the rib are substantially completely closed at the center of the rib and closed to a progressively dimensioning degree toward the outer edge of the rib. In order to guard against fusion or glazing in region 37, it is preferable to provide a dimensioning of the rolls 43 and 44 such that the other regions of the mat are spaced from and will not touch the heated pressure rolls between the grooves 51 and the ribs 50, but will be held in substantially bridging condition therebetween as shown in FIG. 3. Thus, the female grooves and male ridges of calendering rolls 43 and 44 are sized relative to the thickness of the mat and the thinness to be rendered to the regions such that the mat is suspended between the female grooves and the male ridges without touching the intermediate land portions of the calender rolls.

Other compressing, embossing and fusion means may be employed. For example, shaped plates similar to those shown in U.S. application Ser. No. 317,487, now U.S. Pat. No. 3,870,567 filed the same day as this application and assigned to the same assignee.

It is preferable to use teflon coated calender rolls. A spacer material may be utilized between the nonwoven mat and the pressing surface. Examples of such materials which may be used as spacers are Kraft paper, tissue paper, writing paper, fine cotton cloth, etc., which have a rough surface.

The preferred two roll systems can handle a range of web thickness and porosity. In addition the temperature of compaction and the temperature of fusion may be varied independently. It may be possible to operate the second set of rolls at a lower temperature by using a higher pressure.

SPECIAL FEATURES AND LIMITATIONS IN GENERAL

The preferred polymeric plastic resin for making battery separators is a $C_2$ to $C_8$ polyolefin thermoplastic such as polyethylene, polypropylene and polystyrene and the preferred resins of this class are polymers of polypropylene and most preferably polypropylene. By polymers of propylene it is meant, polymers of propylene with other monomers such as styrene. For use in alkaline battery separators other resins such as nylon are preferred. Wetting agents, stabilizers and other additives may be added as desired for the particular application contemplated.

In order to form the preferred nonwoven mat or web of this invention from the preferred resins, and particularly the preferred polypropylene resin, it is important to thermally treat the polymer before extruding it as a fiber in practicing the preferred method. With polypropylene the treatment preferably includes heating the resin in extruder 20 at temperatures in excess of 550° F. and more preferably to temperatures between 600° and 900° F. and most preferably within a range between 620° and 800° F. It is generally preferable to maintain the die at a temperature slightly below that of the extruder barrel. The die temperature may be 20°-100° F. below the barrel temperature. The importance of the thermal treatment seems to be, at least in part, to degrade the polymer and increase the polymers flow properties. In many instances the flow properties are seemingly increased from an impracticable to a practicable condition. This appears to be true of the extrudable fiber forming resins in general when formed into fiber mats according to this invention.

The preferred attenuating fluid is gas in the usual situation and the preferred gas is air. The gas is preferably ejected from the slots immediately above and below the row of die openings at a temperature between 540° F. and 1000° F. For a detailed description of the die 21 reference may be had to U.S. Pat. No. 3,650,866 entitled "Increasing Strip Tensile Strength of Melt Blend Nonwoven Polypropylene Mats of High Tear Resistance", issued Mar. 21, 1972.

The gas flow is controlled so that the fibers as they are attenuated do not significantly come into contact with one another, which could result in "roping" and fiber bundles. The gas is heated as previously set forth and its flow is controlled to produce very fine fibers preferably having diamters between 0.05 and 50 microns, preferably less than 10 microns, more preferably between 1 and 10 microns and most preferably of about 1-5 microns. Suitable polypropylene mats have been attained at air rates between 0.7 and 4 lbs. per minute with the polypropylene fibers attenuated in the gas stream at these rates averging between about 1-10 microns in diameter.

In the preferred process the strands of resin are attenuated into fibers essentially in a plane directly away from the die openings 24. The fibers tend to be dicontinuous. This occurs because of their extreme fineness which results in frequent breaks. Of course, the diameter of individual sections or small portions of the fibers may vary somewhat outside of the given ranges due to the fact that air attenuation does not give perfect control and also because of slight variations in the resin extrudate flow. As used herein, the word fiber refers to either continuous or discontinuous threadlike structure.

The fibers are collected as a self supporting mat on the collecting device 26. The collecting device 26 moves or rotates continuously and is preferably positioned from 1-30 inches from the die openings, more preferably 1-18 inches from the openings and most preferably 3-8 inches from the die openings. The fibers are "self bonded" in the mat in that the mat is coherent, integral and capable of withstanding normal handling such as winding and unwinding, cutting, pressing, calendering, etc. without losing its essential mat-like or web-like character. In most instances, and particularly when the preferred polymers are used, some thermal or melt bonding occurs. Bonding is usually maintained predominantly through the mechanism of entanglement in the original collected web or mat. The mat preferably has a basis weight of between 10 and 500 grams per square meter and more preferably between 20 and 300 grams per square meter. The mat thickness in its original collected state is preferably between 1 and 200 mils, more preferably 20 and 200 mils and most preferably between 20 and 100 mils.

The maximum temperature that the mat can sustain prior to or during compression differs for mats formed from the various resins including the various preferred resins. For example, within the $C_2$ to $C_8$ polyolefin group the temperatures differ for polypropylene as compared to polystyrene or mixtures thereof or as compared to polyethylene. But in general, the temperature is limited by excess shrinkage of the mat and further polymer degradation or melting. It is important, however, that the temperature be high enough to improve the strength, permanence of integrity and other characteristics in a manner sufficient to provide properties essential to the intended use. Thus, it has been found that the mat must generally be heated to above the resins softening point. For a mat of the preferred polypropylene fibers, mat temperatures to which the mat may desirably be heated prior to compaction are from about 280° to 320° F. Compacting should be accomplished at relatively high temperatures, but at substantially less than the melting point for good tortional stiffness. The nonwoven mat is preferably compacted to a thickness of between 5 and 50 mils, more preferably between 10 and 20 mils for preferred use in such applications as battery separators.

In determining the temperatures at which compaction should be carried out with each polymer it may be necessary to employ an empirical technique and this is within the preview of this invention. This technique contemplates selecting the highest temperature at which fusion does not occur, i.e. about 320° F., for polypropylene. Compaction is carried out at that temperature. If porosity is not adequate, then samples are made at progressively lower temperatures until the temperature is found that will fall within the porosity parameters discussed below.

Thus, of necessity, there may be a "zeroing in" approach of finding the fusion temperature and progressively lowering the temperature below the fusion temperature in 2, 3 or 5° increments until the best temperature in the range is found. Generally, that temperature will be about 300° F. for polypropylene. For other polymers and resins, greatly different temperatures will be needed.

Nevertheless, it is important and to be specifically noted that, in general, the proper temperature for achieving the critical parameters for a mat that is to be used as a battery separator, for example, will range quite considerably below the melting point of a particular polymer. As a rule of thumb, that point will be about 5°–20° F., preferably 5°–15° F., above the softening point of the polymer and 5°–50° F., preferably 5°–35° F., below the melting point.

The compacting operation is preferably carried out by utilizing calender rolls, however, a press may also be used to obtain a nonwoven mat of desired properties. In either case, compaction using a fixed gap is preferred. The gap is preferably set so that the areas of the mat that are not going to be fused see a pressure of no more than 10 psi and more preferably from 2–8 psi during compaction. The setting of the gap, the size and composition of the fibers, the closeness or initial compaction of the fibers, the thickness of the initial or starting mat and the thickness of the final or finished mat should be so matched up with the other operating conditions that the compacted mat has a general void fraction or porosity of at leat 40% and preferably a void fraction or porosity of 50–65%. Thus, the porosity retention is preferably greater than 40% and more preferably greater than 50% at the end of the compression phase. The pore size is preferably less than 40 microns and more preferably less than 20 microns. With the preferred mats of this invention, the fixed gap between the compacting means is 3–60 mils for nonfused regions. This, of course, refers to the area of the mat that is not treated to bring about fusion or even significant partial fusion.

The fusion of the fibers in the outer extremity of the ribs or embossments is preferably carried out by exerting a sufficently high pressure to cause the fibers to form a substantially continuous membrane by merging even though they have been heated to a temperature of less than the melting point of the thermoplastic. Normally, if the temperature exceeds the melting point, the resin will run forming holes in the outer extremity of the ribs. The mat's porosity preferably exceeds 40–65%, it should be remembered. The temperature is, however, preferably above the softening point of the thermoplastic. At least a portion of the outer region is preferably pressed to the extent of being only 1.5–25 mils thick, more preferably 3–15 mils thick and most preferably 5–10 mils thick. Not only must the temperature at which fusion is brought about be carefully controlled, the amount of pressure and squeeze down must also be carefully adjusted in relation to temperature, fiber size and the like so that not a single hole occurs in the mat. In a battery separator even one hole of any substantial size, particularly in the rib area, would result in a short.

The fusion may be brought about simultaneously with the compression of the mat in general to create the small pores and other very important mat properties. The presently preferred procedure, however, contemplates first compressing and forming (embossing) the fibrous mat or web simultaneously and thereafter treating the outer region of the embossments to fuse the fibers and eliminate the interstices by heating and pressing this outer region and at the same time maintaining the general or second surface area relatively unheated and free of pressure. If the mat is made of polypropylene fibers, the treatment of the outer region of the embossment is preferably at a temperature between 250°–320° F. In any event, the embossment compression preferably includes the deforming of the nonwoven mat into a corrugated configuration with outer curved corrugations consisting ribs and the area between the corrugations constituting a second region. However, for some applications other embossment configurations or patterns are preferable. For example, the embossment arrangement disclosed in U.S. Ser. No. 258,887, filed June 1, 1972, entitled, BATTERY SEPARATOR, Bonderinko Hollenbeck et al, inventors, assigned to the same assignee at this application.

The specific finished dimensions of the nonwoven web will vary depending on the intended end use. Even in the case of the preferred use as a battery separator, the dimensions will vary with the battery cell design and accordingly the slitting and cutting are carried out to dimension the nonwoven web to fit a specific cell design. It has been found, according to the present invention, that the slitting operation is best carried out immediately after the mat leaves the nip of the last set of in-line calender rolls, when the mat is compacted, embossed and partially fused by calendering. If press plates or other subsequent treatment means are to be used, it is still desirable to slit the mat immediately after calendering since the mat is quite hot after this operation, which facilitates slitting the mat with precision as to any rib pattern being produced.

Small pore size is very important in battery separators. Small pores are an effective barrier to battery plate material going through a separator and bridging between opposite plates of the battery and causing shorting. In order to achieve low electrical resistance in a battery, a high percent porosity is necessary in the nonwoven mat of the present invention.

For any nonwoven mat of given fiber size, an increased percent porosity also increases the maximum pore size because the distance between adjacent fibers must be increased. Thus, decreased pore size may be achieved with a high percent porosity by decreasing the fiber size in the nonwoven mat. By forming the same weight of resin into very small fibers and randomly distributing these fibers, the fiber-to-fiber distance is reduced and thus, smaller maximum pores may be obtained. The very small fiber sizes (1–10 microns) utilized in the present invention makes possible the combination of low electrical resistance and low maximum pore size in the nonwoven mat.

Several special procedures may in certain instances be advantageously added to the process of this invention as set forth above. One such additive procedure is the after-sizing of the embossments. Following the rib formation, compacting and fusion operation, the embossed mat may be passed through an additional set of fixed gap calender rolls. These calender rolls would have a smooth surface and may be operated at from room temperature up to about 290° F. The purpose of this second set of calender rolls is to partially flatten the ribs formed in the previous step so that the battery separator has a more exactly uniform overall configuration. All of the flattened areas should have the maximum degree of fusion as this total area will be subject to engagement against the positive battery plate.

PRODUCT

The mat of this invention is a fibrous mat. The fibers are formed into a sheet having a first surface area and a second surface area with said first surface area extending above the second surface area and having at least a portion of its fibers fused so that there are substantially no openings therebetween. At least a portion of the second surface area has interstices between the fibers. Preferably, there is a region of transition between the fused portion of the mat and the intersticed portion with a steadily increasing fused state extending toward the fused portion from the intersticed portion. The preferred mat has a fused portion 1.5–25 mils thick, more preferably 3–15 mils thick and most preferably 5–10 mils thick and an intersticed portion 5–50 mils thick more preferably 10–20 mils thick, with a porosity retention of greater than 40%, more preferably 50–65% and most preferably greater than 50%. At the same time maximum pore size is preferably less than 40 microns, more preferably less than 20 microns and in better quality sheets runs 7–20 microns. The fibers most preferably have a diameter less than 10 microns, more preferably 1–10 microns preferably about 1–5 microns. The mats preferably have a basis weight of 10–500 grams per square meter and more preferably 20–300 grams per square meter.

The nonwoven mat separator preferably has a corrugated configuration with the outer fused areas being the outer extremities of curved corrugations. The fine fibers of the mat are formed of plastic and preferably the preferred plastic resins already enumerated.

When the separators are subjected to the Standard ER (Electrical Resistance) test of the Battery Council International, 1801 Murchison Drive, Burlingame, Calif., the initial ER after 24 hours is at least no greater than 25 milliohms and more preferably no more than 20 millohms. When assembled in a Group 24, AH battery and tested in accordance with SAE J537g for Cold Start, the performance is at least 1.00 volt per cell at 280 amps after 30 seconds and the electrical resistance is no more than 25 milliohms after the test. High amperage take out during cold start procedures has been observed to cause delamination in mats that do not have the preferred characteristics. There should be no readily observable delamination after the cold start test. This means substantially no delamination areas, irregularities or observable changes in the surface of the mat exceeding the size of a dull pencil point, about 30–50 mils.

TEST AND STATISTICAL PROCEDURES

Various tests are used to ascertain the characteristics of the battery separator. Some of these have already been discussed. Another determination is basis weight which is determined by dividing the weight in gm by the area in square meters. The maximum pore size is a measurement of the largest pores or openings in the structure. Pore size determinations are carried out using an Aminco-Winslow Mercury Porosimeter.

EXAMPLE 1

50 pounds of polypropylene resin, (Enjay, TM Standard Oil Co. E-117) which is a standard commercial resin containing additives such as oxidative stabilizers, is fed to hopper 17 (FIG. 1) and through extruder 20 where it is treated at about 650° F. ±20° F. The extruder feeds through die 21 which is maintained at about 630° F. ±30° F. The attenuating air is about 680° F. ±20° F. at lips of jets 31 and 32. The polymer feed rate is 0.5±0.2 grams/hole/min. The air rate is 30–40 pounds/pound of polymer feed/min. The collector 27 is 9 inches from the die 21. The fibers are collected in a web having a basis weight 175 grams/square meter. The mat is slit to an appropriate battery separator size of 8 inches wide and then run through over 35 operated at 275° F. and thereafter run through compacting and forming calender rolls 41 and 42 operated at 275° F. and compacted to approximately 16 mils thickness by pressing to a gap of 18 mils. The compacted mat is then run through fusing rolls 43 and 44 which are operated at 250° F. and the rib portions are pressed as illustrated in FIGS. 3, 4 and 5. The general surface areas between the embossments or ribs are held away from the rolls as illustrated in FIG. 3. After the second calendering the mat is cooled and cut to 12 inch lengths for use as a battery separator.

Figure 6:
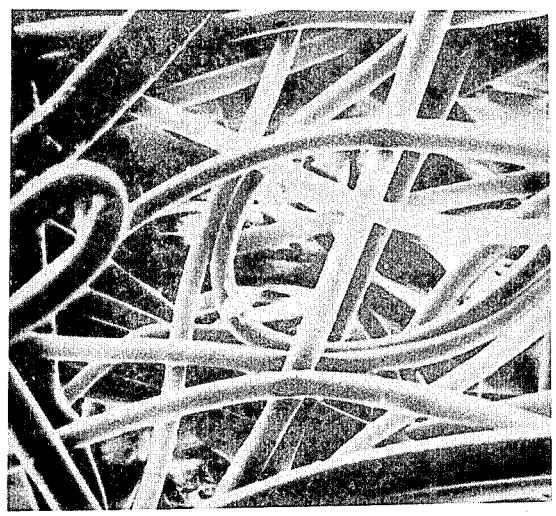
FIG. 6 is a photomicrograph of an embossed rib region before fusion.
Figure 7:
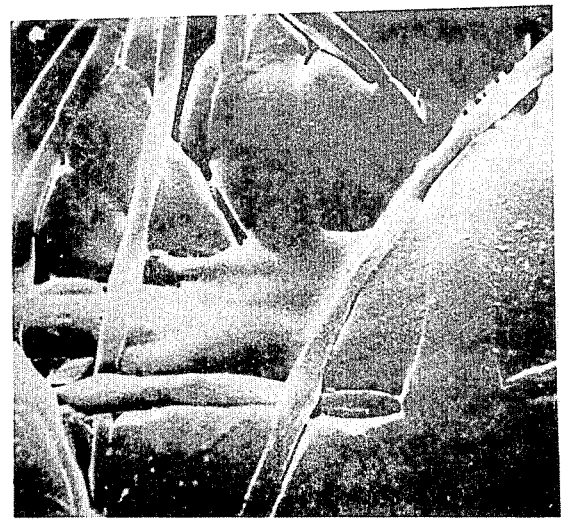
FIG. 7 is a photomicrograph of an embossed rib region with significant fusion.
Figure 8:
FIG. 8 is a photomicrograph of an embossed rib region that is substantially fused.

An example of the mat after processing through rolls 41 and 42 but before processing through rolls 43 and 44 is shown in FIG. 6. Example of the mat after processing through rolls 43 and 44 are shown in FIGS. 7 and 8. In FIG. 7 the fusion of the outer area of the rib is very substantial, but not total. In FIG. 8 the fusion is substantially total. It may be observed that the outline of the original fibers is discernible even though a "membrane" of polymer extends between them. A good indication of the amount of fusion has been found to be the amount of transparency present. A wholly transparent area is generally completely fused.

DISCUSSION OF SOME OF THE SPECIAL ADVANTAGES

It has been found that the fusing of the web surprisingly eliminated the preferential oxidative attack on the rib tops in battery use. This is surprising because the fusion makes the web into a thin membrane and engages it against the most highly oxidative region which is at the face of the positive plate. It should be remembered that the web already contains degraded resin as a result of the high temperature-degradation process of manufacture employed. Thus, the fibers are made of resin that has already been significantly degraded and thus predisposed to further oxidative and degradative deterioration to the point of failure. However, apparently the blocking of this high oxidative environment by removing permeability or some other mechanism or mechanisms eliminate or at least reduce the preferential oxidative attack that had been observed in embossed but nonfused ribs. The fusing of the web also provided a stiffer rib that keeps the backweb more uniformly away from the positive plate. In addition the fusing of the rib makes the entire separator stiffer thus supplying better handling properties in sheet battery separators. The fused rib acts as a tortional beam.

Another surprising benefit flowing from the use of a fused rib separator is its observed resistance to scuffing and abrasion action and damage against the battery plates between which it is engaged. This is particularly noticable in uses such as automobile batteries where vibration from bumps etc. is a constant abrasive influence. Apparently, the little fibers tend to be scuffed up and oxidized while the fused rib takes the scuffing without being cut through. This is particularly surprising when one considers that the fused area is substantially thinner.

A further benefit of the fused rib is its greater force of resiliency. Thus, when the fused rib separator is engaged between the battery plates and they are squeezed tightly into a battery cell the resiliency of the separators pushing outwardly under compression holds the assembly more ridgedly in position in the cell reducing slipping and the like which would accentuate damage to the battery plates as well as abrasion and the like of the separators themselves. The increased stiffness also increases the resistance of the rib to collapsing in use.

All of the above advantages are gained without the necessity of providing an "armored", coated or entirely independent, rib. Thus, bonding problems and the like are avoided.

Of course, there are some disadvantages in the fused rib. One of the most obvious ones is the increased ER due to loss of porosity. The loss of porosity has been about 10% in prepared separators. Of course, the bigger the fused area, the greater the trade off in ER.

It has been found to be important to change gradually from the fused condition to wholly porous condition. One important benefit provided by this gradual transition is the lessening of stress. Polymers in general degrade more rapidly under stress and degradation has already been pointed out as a problem. The need for fusion diminishes as one moves away from the outermost tip of the rib. The less the amount of fusion, the less the blocking of the electrolyte and the lower the ER. In addition, some advantage is gained in the critical tolerances imposed during manufacturing because there is less chance of cutting into the web during pressing.

It will be obvious to those skilled in the art that various changes and modifications may be made in the invention without departing from its true spirit and scope. It is, therefore, aimed in the appended claims to cover all such equivalent variations as fall within the true spirit and scope of the invention.

We claim:

1. A battery separator comprising a nonwoven mat, said nonwoven mat comprised of plastic fibers and having a first region with interstices between said plastic fibers rendering said nonwoven mat porous and a second region extending outwardly of said first region, the plastic fibers at the outer extremity portion of said second region being fused rendering said outer extremity of said second region of said nonwoven mat imporous.

2. The battery separator of claim 1 wherein said second region is a plurality of raised ribs and said first region constitutes a general sheet configuration of said mat which sheet configuration has a face defined by a general surface level.

3. The battery separator of claim 1 wherein said mat has a zone between said fused portion and said intersticed region with a steadily increasing fused state extending toward said fused portion from said intersticed region.

4. The battery separator of claim 1 wherein said fibers have a diameter of 0.05-50 microns, at least part of said imporous portion is 3-15 mils thick and said intersticed region is 5-50 mils thick with a porosity retention of greater than 40% and a maximum pore size of less than 40 microns.

5. The battery separator of claim 4 wherein said mat has a basis weight of 10-500 grams per square meter, said second region is a plurality of spaced apart linear ribs extending across the mat from one edge to an opposite edge and said battery separator has an initial ER of no more than 25 milliohms after 24 hours and provides a cold start performance of at least 1 volt per cell in a Group 24, AH battery at 280 amps after 30 seconds and an ER no more than 25 milliohms after the test, and exhibits no substantial delamination after 6 months of standard use in a Group 24, AH battery or after a cold start performance test.

6. The battery separator of claim 5 wherein said fibers are thermoplastic and 1-5 microns in diameter, said first region has a thickness of 10-20 mils with a porosity greater than 50%, a maximum pore size less than 30 microns and said mat has a basis weight of 20-300 grams per square meter.

7. The battery separator of claim 4 engaged in a battery cell between a positive and a negative plate with its fused portion engaged against said positive plate and its first intersticed region spaced from said positive plate, said positive and said negative plate held tightly in position in said cell by the force of resiliency of said battery separator.

* * * * *